United States Patent
Honjo

(10) Patent No.: US 11,265,456 B2
(45) Date of Patent: Mar. 1, 2022

(54) CONTROL DEVICE, PHOTOGRAPHING DEVICE, MOBILE OBJECT, CONTROL METHOD, AND PROGRAM FOR IMAGE ACQUISITION

(71) Applicant: SZ DJI TECHNOLOGY CO., LTD., Shenzhen (CN)

(72) Inventor: Kenichi Honjo, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/086,056

(22) Filed: Oct. 30, 2020

(65) Prior Publication Data
US 2021/0075973 A1 Mar. 11, 2021

Related U.S. Application Data

(63) Continuation of application No. PCT/CN2019/087404, filed on May 17, 2019.

(30) Foreign Application Priority Data

May 22, 2018 (JP) .............................. JP2018-098295

(51) Int. Cl.
*H04N 5/232* (2006.01)
*B64C 39/02* (2006.01)
*B64D 47/08* (2006.01)
*G03B 17/56* (2021.01)

(52) U.S. Cl.
CPC ..... *H04N 5/232127* (2018.08); *B64C 39/024* (2013.01); *B64D 47/08* (2013.01);
(Continued)

(58) Field of Classification Search
CPC ....... H04N 5/232127; H04N 5/232125; H04N 5/23299; H04N 5/232133; H04N 5/23258;
(Continued)

(56) References Cited

U.S. PATENT DOCUMENTS

| 2009/0190023 A1* | 7/2009 | Mise | ...................... G03B 13/00 348/345 |
| 2010/0201864 A1 | 8/2010 | Takayama | |

(Continued)

FOREIGN PATENT DOCUMENTS

| CN | 1497320 A | 5/2004 |
| CN | 1716078 A | 1/2006 |

(Continued)

OTHER PUBLICATIONS

The World Intellectual Property Organization (WIPO) International Search Report for PCT/CN2019/087404 dated Aug. 20, 2019 4 Pages (including translation).

*Primary Examiner* — Twyler L Haskins
*Assistant Examiner* — Angel L Garces-Rivera
(74) *Attorney, Agent, or Firm* — Anova Law Group, PLLC

(57) ABSTRACT

A control device includes a processor and a storage medium storing a program that, when executed by the processor, causes the processor to obtain a reference distance of a photographing device that includes a height of the photographing device or a distance from the photographing device to a target object, determine a range of a focus distance of the photographing device according to the reference distance, and control the photographing device to shoot a plurality of images while changing the focus distance within the range.

18 Claims, 8 Drawing Sheets

(52) U.S. Cl.
CPC ....... *G03B 17/561* (2013.01); *H04N 5/23258* (2013.01); *H04N 5/23299* (2018.08); *H04N 5/232125* (2018.08); *H04N 5/232133* (2018.08); *B64C 2201/127* (2013.01); *B64C 2201/146* (2013.01)

(58) Field of Classification Search
CPC .. H04N 5/23287; H04N 5/222; B64C 39/024; B64C 2201/127; B64C 2201/146; B64D 47/08; G03B 17/561; G03B 15/00; G03B 17/56; G02B 7/28; G02B 7/36
See application file for complete search history.

(56) References Cited

U.S. PATENT DOCUMENTS

| | | |
|---|---|---|
| 2012/0154670 A1 | 6/2012 | Hamamura |
| 2014/0176783 A1 | 6/2014 | Shibagami |
| 2018/0204331 A1* | 7/2018 | Omari ................... G01S 13/878 |

FOREIGN PATENT DOCUMENTS

| | | |
|---|---|---|
| CN | 1856021 A | 11/2006 |
| CN | 101493567 A | 7/2009 |
| CN | 101494735 A | 7/2009 |
| CN | 101742107 A | 6/2010 |
| CN | 102348058 A | 2/2012 |
| CN | 104038689 A | 9/2014 |
| CN | 106254754 A | 12/2016 |
| CN | 106998424 A | 8/2017 |
| CN | 107079102 A | 8/2017 |
| CN | 207191469 U | 4/2018 |
| JP | 2006317593 A | 11/2006 |
| JP | 2017062529 A | 3/2017 |
| JP | 2019032370 A | 2/2019 |
| WO | 2017006538 A1 | 1/2017 |
| WO | 2017090233 A1 | 6/2017 |

* cited by examiner

CONTROL DEVICE, PHOTOGRAPHING DEVICE, MOBILE OBJECT, CONTROL METHOD, AND PROGRAM FOR IMAGE ACQUISITION

CROSS-REFERENCE TO RELATED APPLICATIONS

This application is a continuation of International Application No. PCT/CN2019/087404, filed May 17, 2019, which claims priority to Japanese Application No. 2018-098295, filed May 22, 2018, the entire contents of both of which are incorporated herein by reference.

A portion of the disclosure of this patent document (e.g., the claims, description, drawings, and abstract) contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to a control device, a photographing device, a mobile object, a control method and a program.

BACKGROUND

Patent Document 1 discloses a photographing device which causes an image processing unit to generate moving image data while moving a focus position of an optical system, and gets a still image focusing on a designated area from a plurality of frames of images contained in the moving image data.
Patent Document 1: International Application Publication No. WO2017/006538.

It is desirable to be able to determine a lens position of a focus lens focused on a desired shot object more efficiently.

SUMMARY

In accordance with the disclosure, there is provided a control device including a processor and a storage medium storing a program that, when executed by the processor, causes the processor to obtain a reference distance of a photographing device that includes a height of the photographing device or a distance from the photographing device to a target object, determine a range of a focus distance of the photographing device according to the reference distance, and control the photographing device to shoot a plurality of images while changing the focus distance within the range.

Also in accordance with the disclosure, there is provided a photographing device including a control device and an image sensor controlled by the control device. The control device includes a processor and a storage medium storing a program that, when executed by the processor, causes the processor to obtain a reference distance of a photographing device that includes a height of the photographing device or a distance from the photographing device to a target object, determine a range of a focus distance of the photographing device according to the reference distance, and control the photographing device to shoot a plurality of images while changing the focus distance within the range.

Also in accordance with the disclosure, there is provided a mobile object including a photographing device and a support mechanism configured to support the photographing device and control an attitude of the photographing device. The photographing device includes a control device and an image sensor controlled by the control device. The control device includes a processor and a storage medium storing a program that, when executed by the processor, causes the processor to obtain a reference distance of a photographing device that includes a height of the photographing device or a distance from the photographing device to a target object, determine a range of a focus distance of the photographing device according to the reference distance, and control the photographing device to shoot a plurality of images while changing the focus distance within the range.

Also in accordance with the disclosure, there is provided a control method including obtaining a reference distance of a photographing device that includes a height of the photographing device or a distance from the photographing device to a target object, determining a range of a focus distance of the photographing device according to the reference distance, and controlling the photographing device to shoot a plurality of images while changing the focus distance within the range.

Also in accordance with the disclosure, there is provided a non-transitory computer-readable storage medium storing a program that, when executed by a computer, causes the computer to perform a control method including obtaining a reference distance of a photographing device that includes a height of the photographing device or a distance from the photographing device to a target object, determining a range of a focus distance of the photographing device according to the reference distance, and controlling the photographing device to shoot a plurality of images while changing the focus distance within the range.

DETAILED DESCRIPTION OF THE EMBODIMENTS

Figure 1:
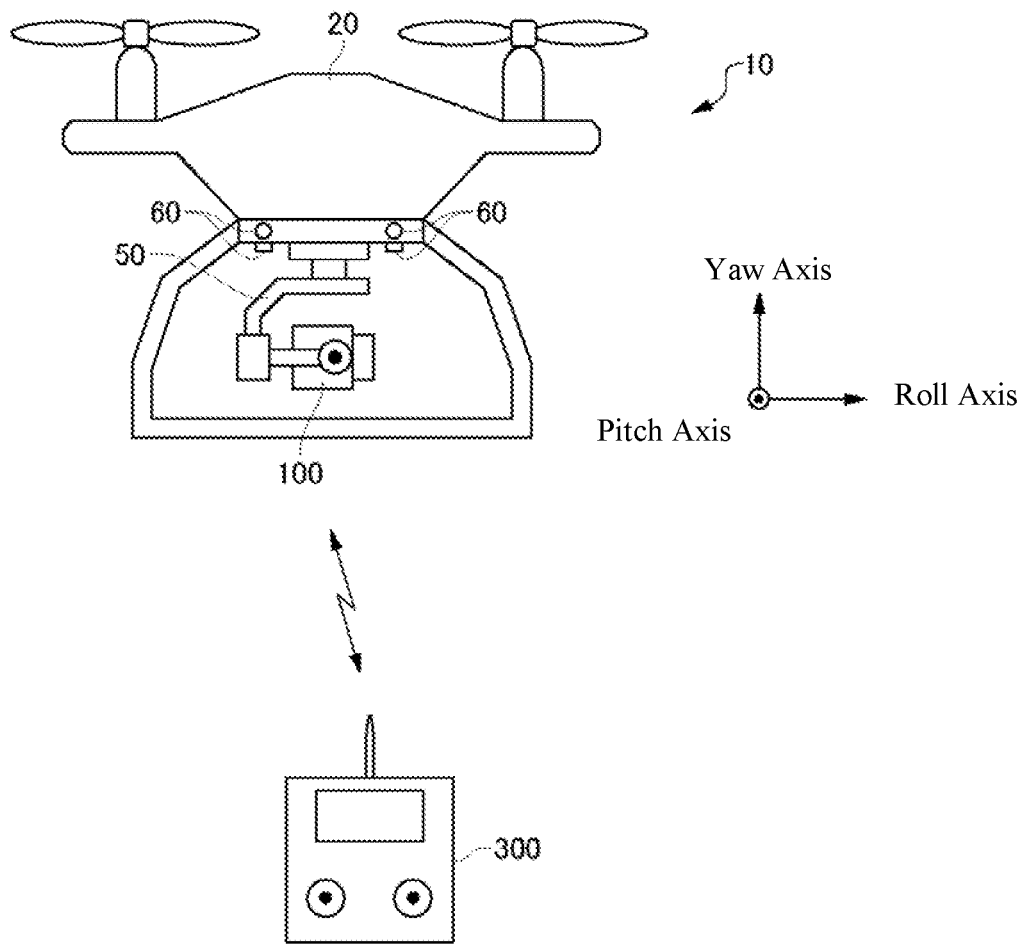
FIG. 1 is a schematic diagram showing an unmanned aerial vehicle (UAV) and a remote operation device according to an embodiment of the disclosure.

The technical solutions in the example embodiments of the present disclosure will be described clearly with reference to the accompanying drawings. The described embodiments are only some of the embodiments of the present disclosure, rather than all the embodiments. Based on the embodiments of the present disclosure, all other embodiments obtained by a person of ordinary skill in the art without creative efforts shall fall within the scope of the present disclosure.

Various embodiments of the present disclosure are described with reference to flowcharts and block diagrams. A block may represent a stage of a process of performing operations or a "unit" of a device that performs operations. The specific stage and "unit" can be implemented by programmable circuits and/or processors. A dedicated circuit may include a digital and/or an analog circuit, or may include an integrated circuit (IC) and/or a discrete circuit. A programmable circuit may include a reconfigurable circuit. The reconfigurable circuit may include a circuit with a logic operation such as logic AND, logic OR, logic XOR, logic NAND, logic NOR, or another logic operation, a flip-flop, a register, a field programmable gate array (FPGA), a programmable logic array (PLA), or another memory component.

The computer-readable medium may include any tangible device that can store instructions to be executed by a suitable device. As a result, the computer-readable medium with instructions stored is provided with a product including instructions that can be executed to create means for performing operations specified by the flowchart or the block diagram. The computer-readable medium may include electronic storage media, magnetic storage media, optical storage media, electromagnetic storage media, semiconductor storage media, or the like. As a more specific example of the computer-readable medium, it may include a floppy disk (registered trademark), a floppy disk, a hard disk, a random-access memory (RAM), a read-only memory (ROM), an erasable programmable read-only memory (EPROM or a flash memory), an electrically erasable programmable read-only memory (EEPROM), a static random access memory (SRAM), a compact disc read-only memory (CD-ROM), a digital versatile disc (DVD), a Blu-ray® disc, a memory stick, or an integrated circuit card, etc.

The computer-readable instructions may include any one of source code or object code described in any combination of one or more programming languages. The source code or object code can include a programming language such as assembly instructions, instruction set architecture (ISA) instructions, machine instructions, machine-related instructions, microcode, firmware instructions, status setting data, or object-oriented programming languages such as Smalltalk, JAVA (registered trademark), C++, etc., or "C" programming language or similar programming languages. The computer-readable instructions may be provided locally or via a wide area network (WAN) such as a local area network (LAN) or an internet to a processor or a programmable circuit of a general-purpose computer, a special-purpose computer, or other programmable data processing device. The processor or programmable circuit can execute computer-readable instructions to create means for performing the operations specified in the flowchart or block diagram. Examples of processors include computer processors, processing units, microprocessors, digital signal processors, controllers, microcontrollers, and so on.

FIG. 1 is a schematic diagram showing an unmanned aerial vehicle (UAV) 10 and a remote operation device 300 according to an embodiment of the disclosure. The UAV 10 includes a UAV body 20, a gimbal 50, a plurality of photographing devices 60, and a photographing device 100. The gimbal 50 and the photographing device 100 are an example of a photographing system. The UAV 10 is an example of a mobile object, while the latter can include an aerial object movable in the air, a vehicle movable on the ground, or a ship movable on water. The aerial object movable in the air can include not only UAV, but also other aircraft, airship, or helicopter that is movable in the air.

The UAV body 20 includes a plurality of rotors. The plurality of rotors are an example of a propulsion unit. The UAV body 20 causes the UAV 10 to fly by controlling the rotation of the plurality of rotors. The UAV body 20 uses, for example, four rotors to fly the UAV 10. The number of rotors is not limited to four. Further, the UAV 10 may also be a fixed-wing aircraft without rotors.

The photographing device 100 may be an imaging camera that shoots an object included in a desired shooting range. The gimbal 50 rotatably supports the photographing device 100. The gimbal 50 is an example of a support mechanism. For example, the gimbal 50 may use an actuator to support the photographing device 100 rotatably around a pitch axis. The gimbal 50 may use actuators to further support the photographing device 100 rotatably around a roll axis and a yaw axis, respectively. The gimbal 50 can change an attitude of the photographing device 100 by rotating the photographing device 100 around at least one of the yaw axis, the pitch axis, or the roll axis.

The plurality of photographing devices 60 may be sensing cameras that shoot surroundings of the UAV 10 in order to control the flight of the UAV 10. The two photographing devices 60 may be provided at a nose, that is, the front of the UAV 10. Furthermore, the other two photographing devices 60 may be provided at a bottom surface of the UAV 10. The two photographing devices 60 on the front side may be paired to function as a stereo camera. The two photographing devices 60 on the bottom side may also be paired to function as a stereo camera. Three-dimensional spatial data around the UAV 10 can be generated from images shot by the plurality of photographing devices 60. Further, the number of photographing devices 60 included in the UAV 10 is not limited to four. The UAV 10 may include at least one photographing device 60. The UAV 100 may include at least one photographing device 60 at each of the nose, a tail, a side surface, a bottom surface, and a top surface of the UAV 10. An angle of view of the photographing device 60 may be greater than an angle of view of the photographing device 100. The photographing device 60 may have a single focus lens or a fisheye lens.

The remote operation device 300 communicates with the UAV 10 to remotely operate the UAV 10. The remote operation device 300 can wirelessly communicate with the UAV 10. The remote operation device 300 transmits to the UAV 10 instruction information indicating various instructions related to the movement of the UAV 10 such as ascending, descending, accelerating, decelerating, going forward, going backward, or rotating. The instruction information may include instruction information to raise a height of the UAV 10. The instruction information may show the height at which the UAV 10 should be located. The UAV 10 moves to the height indicated by the instruction information received from the remote operation device 300. The instruction information may include an ascending instruction to raise the UAV 10. UAV 10 ascends while receiving the ascending instruction. When the height of the UAV 10 has reached an upper height limit, the UAV 10 can be prevented from ascending even if the ascending instruction is received.

Figure 2:
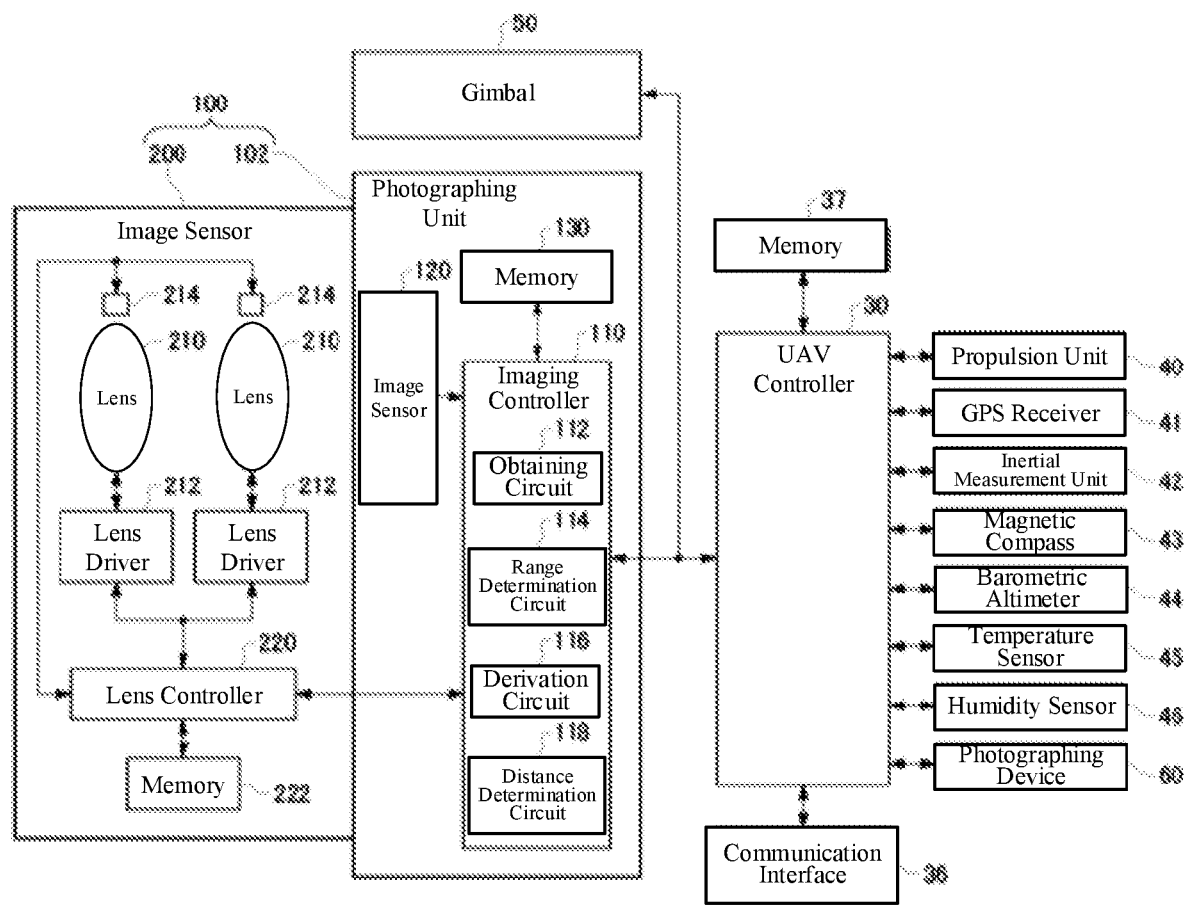
FIG. 2 is a diagram showing functional blocks of a UAV according to an embodiment of the disclosure.

FIG. 2 shows functional blocks of the UAV 10 according to an embodiment of the disclosure. The UAV 10 includes a UAV controller 30, a memory 37, a communication interface 36, a propulsion unit 40, a GPS receiver 41, an inertial measurement unit (IMU) 42, a magnetic compass 43, a barometric altimeter 44, temperature sensor 45, a humidity sensor 46, a gimbal 50, a photographing device 60, and a photographing device 100.

The communication interface 36 communicates with other devices such as the remote operation device 300. The communication interface 36 may receive instruction information including various instructions to the UAV controller 30 from the remote operation device 300. The memory 37 stores programs that the UAV controller 30 uses to control the propulsion unit 40, the GPS receiver 41, the IMU 42, the magnetic compass 43, the barometric altimeter 44, the temperature sensor 45, the humidity sensor 46, the gimbal 50, the photographing device 60, and the photographing device 100. The memory 37 may be a computer-readable recording medium, and may include at least one of an SRAM, a DRAM, an EPROM, an EEPROM, or a flash memory such as a USB memory or a solid-state drive (SSD). The memory 37 may be provided inside the UAV body 20. The memory may be configured to be detachable from the UAV body 20.

The UAV controller 30 may control a flight and shooting of the UAV 10 in accordance with a program stored in the memory 37. The UAV controller 30 may be constituted by a microprocessor such as a CPU or an MPU, a microcontroller such as an MCU, or the like. The UAV controller 30 may control the flight and shooting of the UAV 10 in accordance with instructions received from the remote operation device 300 via the communication interface 36. The propulsion unit 40 propels the UAV 10. The propulsion unit 40 includes a plurality of rotors and a plurality of drive motors that rotate the plurality of rotors. The propulsion unit 40 rotates the plurality of rotors via the plurality of drive motors according an instruction from the UAV controller 30 to cause the UAV 10 to fly.

The GPS receiver 41 receives a plurality of signals indicating the time transmitted from a plurality of GPS satellites. The GPS receiver 41 calculates a position (latitude and longitude) of the GPS receiver 41, that is, a position (latitude and longitude) of the UAV 10 based on the received plurality of signals. The IMU 42 detects an attitude of the UAV 10. The IMU 42 detects accelerations in directions of three axes of front-back, left-right, and up-down, and angular velocities in directions of three axes of a pitch axis, a roll axis, and a yaw axis of the UAV 10 as the attitude of the UAV 10. The magnetic compass 43 detects an orientation of a nose of the UAV 10. The barometric altimeter 44 detects a flight height of the UAV 10. The barometric altimeter 44 detects an air pressure around the UAV 10 and converts the detected air pressure to a height to detect the height. The temperature sensor 45 detects a temperature around the UAV 10. The humidity sensor 46 detects a humidity around the UAV 10.

The photographing device 100 includes a photographing unit 102 and a lens unit 200. The lens unit 200 is an embodiment of a lens device. The photographing unit 102 includes an image sensor 120, an imaging controller 110, and a memory 130. The image sensor 120 may include CCD or CMOS. The image sensor 120 shoots optical images formed through a plurality of lenses 210 and outputs the shot images to the imaging controller 110. The imaging controller 110 may be constituted by a microprocessor such as a CPU or an MPU, a microcontroller such as an MCU, or the like. The imaging controller 110 may control the photographing device 100 in accordance with an operation instruction of the photographing device 100 from the UAV controller 30.

The imaging controller 110 is an example of a first controller and a second controller. The memory 130 may be a computer-readable recording medium, and may include at least one of an SRAM, a DRAM, an EPROM, an EEPROM, or a flash memory such as a USB memory or an SSD. The memory 130 stores programs that the imaging controller 110 uses to control the image sensor 120 and the like. The memory 130 may be provided inside a housing of the photographing device 100. The memory 130 may be configured to be detachable from the housing of the photographing device 100.

The lens unit 200 includes a plurality of lenses 210, a plurality of lens drivers 212, and a lens controller 220. The plurality of lenses 210 may include zoom lenses, varifocal lenses, or focus lenses. At least a part of or the entire plurality of lenses 210 are configured to be movable along an optical axis. The lens unit 200 may be an interchangeable lens that is provided to be detachable from the photographing unit 102. The lens driver 212 moves at least a part of or the entire plurality of lenses 210 along the optical axis through a mechanism member such as a cam ring. The lens driver 212 may include an actuator. The actuator may include a stepper motor. The lens controller 220 drives the lens driver 212 according to a lens control command from the photographing unit 102, and moves at least one of the plurality of lenses 210 along the optical axis through a mechanism member. The lens control command may be a zoom control command or a focus control command.

The lens unit 200 further includes a memory 222 and a position sensor 214. The lens controller 220 controls the lens 210 via the lens driver 212 to move along the optical axis according to the lens operation command from the photographing unit 102. Some or all of the plurality of lenses 210 move along the optical axis. The lens controller 220 performs at least one of a zoom action or a focus action by moving at least one of the lenses 210 along the optical axis. The position sensor 214 detects a position of the lens 210. The position sensor 214 can detect a current zoom position or a current focus position.

The lens driver 212 may include a shake correction mechanism. The lens controller 220 may move the lens 210 in a direction along the optical axis or a direction perpendicular to the optical axis via a shake correction mechanism to perform shake correction. The lens driver 212 may drive a shake correction mechanism by a stepper motor to perform shake correction. Further, the shake correction mechanism may be driven by a stepper motor to move the image sensor 120 in a direction along the optical axis or a direction perpendicular to the optical axis to perform shake correction.

The memory 222 stores control values of the plurality of lenses 210 moved via the lens driver 212. The memory 222 may include at least one of an SRAM, a DRAM, an EPROM, an EEPROM, or a flash memory such as a USB memory.

In the UAV 10 configured as described above, the photographing device 100 can efficiently determine a lens position of the focus lens focused on a desired object based on a focus evaluation value that evaluates a focus state such as an evaluation value of contrast.

For example, when the photographing device 100 performs a contrast autofocus, it derives the focus evaluation value while moving the focus lens from an infinity side to a closest side. Then, the photographing device 100 determines a lens position of the focus lens at which an extreme value of the focus evaluation value is obtained, as the lens position of the focus lens focused on the desired subject. However, there is also a scenario in which the photographing device 100 shoots a person on the ground while the UAV 10 is flying. A height of the person can be determined to a certain extent. Therefore, if a height of the UAV 10 can be determined, a distance from the photographing device 100 to the person can be determined to a certain extent. That is, there is a high possibility that the lens position of the focus lens at which the extreme value of the focus evaluation value is obtained can be determined without the photographing device 100 moving the focus lens from the infinity side to the closest side.

Therefore, consistent with the disclosure, based on the height of the photographing device 100 or the distance from the photographing device 100 to a shot object, a range of the lens position of the focus lens that is a target for deriving the focus evaluation value is limited. The "shot object" refers to an object being shot, and is also referred to as a "target object." As a result, unnecessary movement of the focus lens is avoided, and the lens position of the focus lens at which the desired object is focused on can be determined efficiently. By avoiding unnecessary movement of the focus lens, the power consumed by the photographing device 100 is suppressed.

Further, while the photographing device 100 moves the focus lens, more images are shot near the determined lens position of the focus lens than at positions except the determined lens position of the focus lens. The photographing device 100 shoots moving images while moving the focus lens. Further, while moving the focus lens, the photographing device 100 shoots more images near the determined lens position of the focus lens than at other positions except the determined lens position of the focus lens. The photographing device 100 can generate a still image by allowing a user to select an image focused on a desired object from the shot moving images. The photographing device 100 shoots more images near the focus position at which the focus evaluation value is relatively high. Therefore, the photographing device 100 can more reliably shoot an image focusing on the desired object.

The imaging controller 110 includes an obtaining circuit 112, a range determination circuit 114, a derivation circuit 116, and a distance determination circuit 118. The obtaining circuit 112 obtains the height of the photographing device 100. The obtaining circuit 112 may obtain the height of the UAV 10 measured by the barometric altimeter 44 and use it as the height of the photographing device 100. Based on the height of the photographing device 100, the range determination circuit 114 determines a first range of the focus distance of the photographing device 100 from which the focus evaluation value should be derived. The focus distance is a distance from the photographing device 100 to an object in a focus state. The focus state is, for example, a state in which the focus evaluation value is greater than or equal to a preset value in an image shot by the photographing device 100.

The range determination circuit 114 may determine a range from infinity to a first distance as the first range of the focus distance. The first distance may be a distance obtained by subtracting a preset amount from a distance from the photographing device 100 to the ground or the sea. The distance from the photographing device 100 to the ground or the sea may correspond to the height of the photographing device 100. The range determination circuit 114 may determine a range from infinity to a certain distance as the first range of the focus distance. The certain distance is closer to the photographing device 100 by a preset amount than the distance from the photographing device 100 to the ground or the sea corresponding to the height of the photographing device 100. In order to determine the extreme value of the focus evaluation value, the focus lens needs to be moved to a position farther than the lens position at which the extreme value of the focus evaluation value is obtained. Therefore, the range determination circuit 114 may determine the first range of the focus distance to be a range to a preset distance that is closer to the photographing device 100 by a preset amount. The ground can also be defined as a floor of a certain building. The height can be determined based on the floor.

The obtaining circuit 112 may obtain a distance from the photographing device 100 to the shot object. The distance from the photographing device 100 to the shot object and the height of the photographing device 100 described above are both referred to as a "reference distance." The obtaining circuit 112 may obtain a distance between the shot object and a measurement device, e.g., a ranging sensor such as an infrared sensor or an ultrasonic sensor, a stereo camera, etc., as the distance from the photographing device 100 to the shot object. The range determination circuit 114 may determine the first range of the focus distance of the photographing device 100 from which the focus evaluation value should be derived based on the distance from the photographing device 100 to the shot object. The range determination circuit 114 may determine a range from infinity to a certain distance as the first range of the focus distance. The certain distance is closer to the photographing device 100 by a preset amount than the distance from the photographing device 100 to the shot object.

Figure 3:
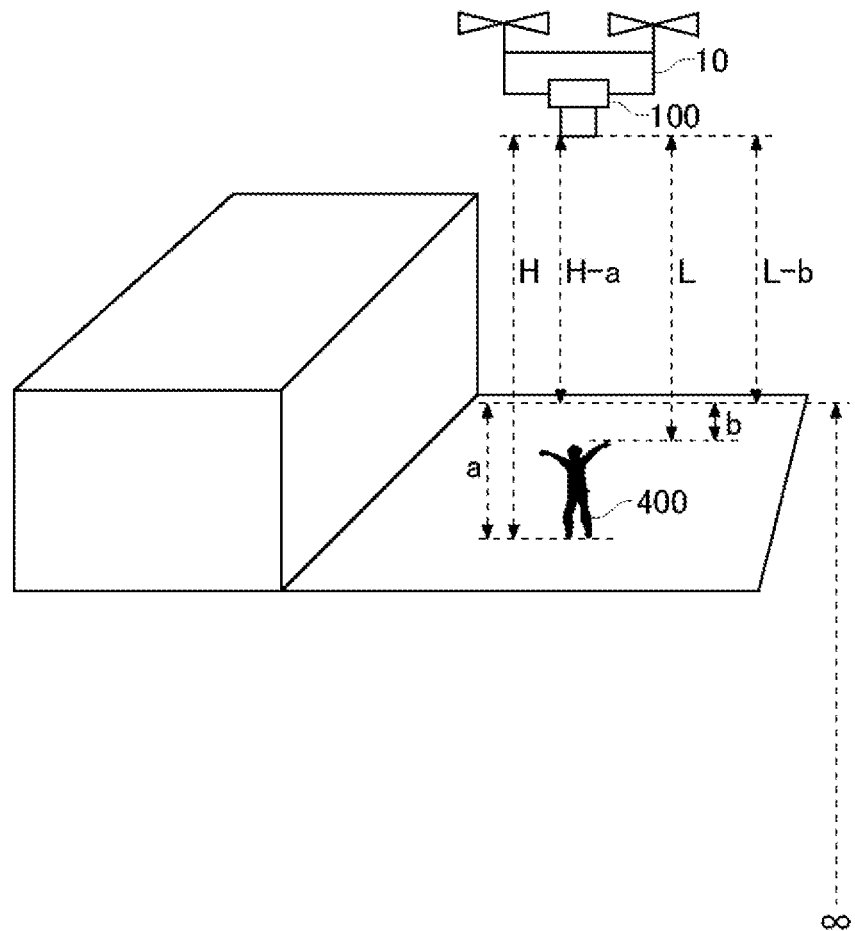
FIG. 3 is a diagram for explaining a first range of a focus distance.

For example, as shown in FIG. 3, the range determination circuit 114 may determine a range from infinity to a distance H-a as the first range of the focus distance, and the distance H-a is closer to the photographing device 100 by a preset amount a than the distance from the photographing device 100 to the ground corresponding to the height of the photographing device 100. The range determination circuit 114 may determine a range from infinity to a distance L-b as the first range of the focus distance. The distance L-b is closer to the photographing device 100 by a preset amount b than the distance L from the photographing device 100 to the shot object. The preset amount can be set in advance according to the type of the shot object. The preset amount can be set in advance according to a size of the shot object. The preset amount can be set in advance according to a product of a height of the shot object and a preset ratio.

The imaging controller 110 causes the photographing device 100 to shoot a plurality of images while changing the focus distance within the first range of the focus distance. That is, the imaging controller 110 causes the photographing device 100 to shoot a plurality of images while changing the lens position of the focus lens within the first range of the focus distance. The derivation circuit 116 derives the focus evaluation values for various focus distances based on the plurality of shot images. The derivation circuit 116 derives the focus evaluation values for various lens positions within a lens position range of the focus lens corresponding to the first range based on the plurality of shot images.

The distance determination circuit 118 determines a first focus distance of the photographing device that should cause the photographing device 100 to shoot an image based on the focus evaluation value derived by the derivation circuit 116. The first focus distance is also referred to as an "in-focus distance." The distance determination circuit 118 determines a lens position of the focus lens at which a focus evaluation value as an extreme value among the various focus evaluation values derived by the derivation circuit 116 is obtained, and determines a focus distance corresponding to the lens position as the first focus distance. Therefore, in order to determine the lens position of the focus lens for focusing on the desired object, a movement range of the focus lens for which a focus evaluation value should be derived is limited to a range based on the height of the photographing device 100 or the distance to the shot object. Thereby, the lens position of the focus lens can be efficiently determined for focusing on the desired object without moving the focus lens unnecessarily.

The imaging controller 110 can cause the photographing device 100 to shoot a plurality of images while changing the focus distance of the photographing device 100 within a second range of the focus distance including the first focus distance. The imaging controller 110 can cause the photographing device 100 to shoot a plurality of images while moving the focus lens within a lens position range including the lens position of the focus lens corresponding to the first focus distance. While changing the focus distance of the photographing device 100, the imaging controller 110 can cause the photographing device to shoot more images per unit distance range within the second range of the focus distance including the first focus distance than outside the second range. While changing the focus distance of the photographing device 100, the imaging controller 110 can cause the photographing device 100 to shoot moving images at a higher frame rate within the second range of the focus distance including the first focus distance than outside the second range.

Figure 4:
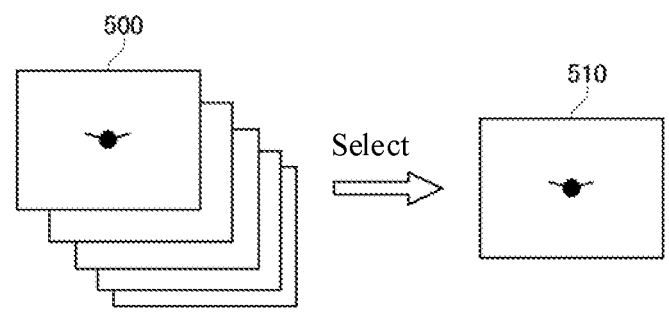
FIG. 4 is a diagram for explaining a selection of a desired image from a plurality of images.

As shown in FIG. 4, the photographing device 100 can generate a still image 510 by allowing a user to select an image focused on the desired shot object among the plurality of shot images 500 while changing the focus distance of the photographing device 100 within the second range of the focus distance including the first focus distance.

Figure 5:
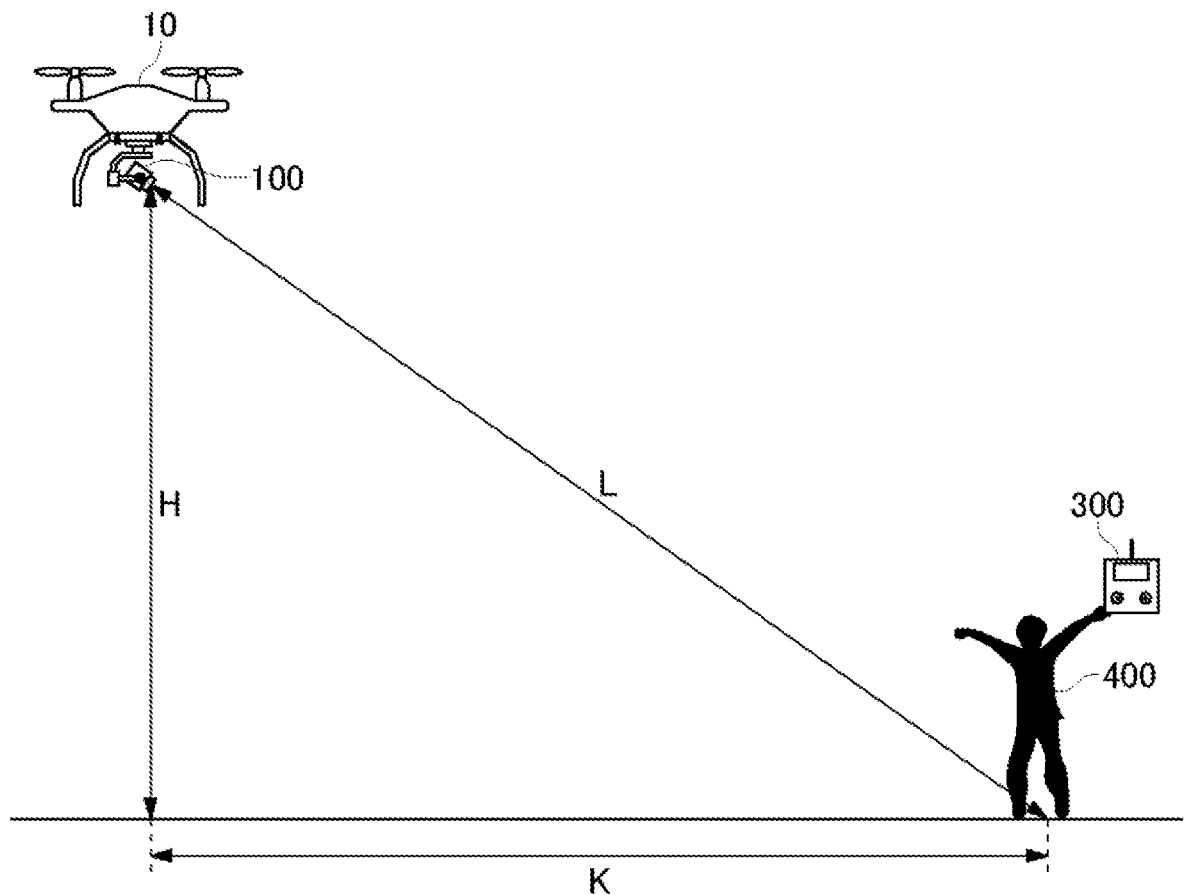
FIG. 5 is a diagram for explaining a method of obtaining a distance from a photographing device to a shot object according to an embodiment of the disclosure.

As shown in FIG. 5, there is a scenario in which a user 400 operates the UAV 10 via the remote operation device 300 so that the photographing device 100 mounted at the UAV 10 shoots the user 400 as the shot object. When the remote operation device 300 has a GPS function, the remote operation device 300 can determine a current position of the remote operation device 300. The UAV 10 may also have a GPS function. Therefore, the obtaining circuit 112 may calculate a distance K based on the current position (latitude and longitude) of the remote operation device 300 and the current position (latitude and longitude) of the UAV 10. Further, the obtaining circuit 112 may calculate a distance L from the photographing device 100 to the user 400 based on a current height H and the distance K of the UAV 10. Therefore, the obtaining circuit 112 can obtain a distance from the photographing device 100 to the object. Further, there is a tracking mode as an operation mode of the UAV 10. In the tracking mode, the UAV 10 flies in a manner to maintain a preset distance from the remote operation device 300. When the UAV 10 is operating in the tracking mode, the obtaining circuit 112 may obtain a distance set in the tracking mode as the distance from the photographing 100 to the shot object.

Figure 6:
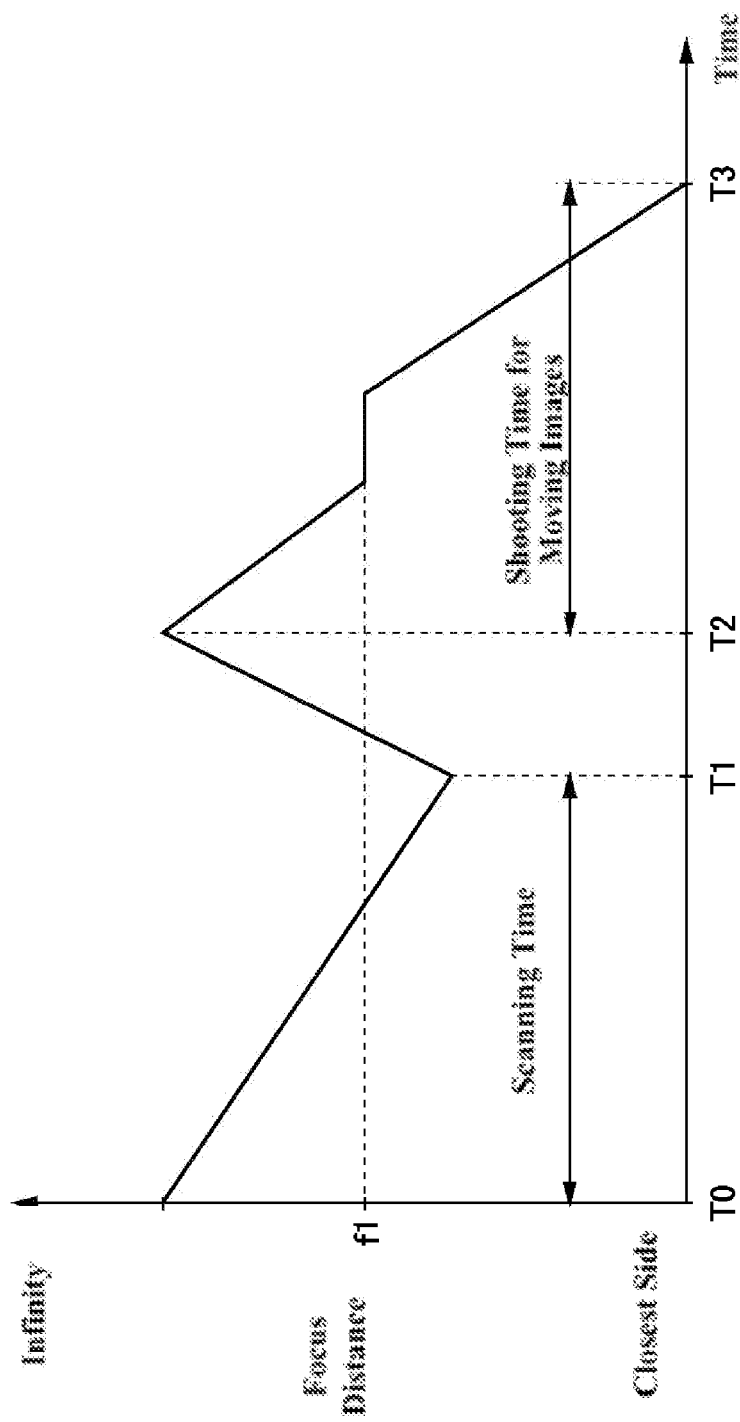
FIG. 6 is a diagram showing a relationship between a focus distance and time according to an embodiment of the disclosure.
Figure 7:
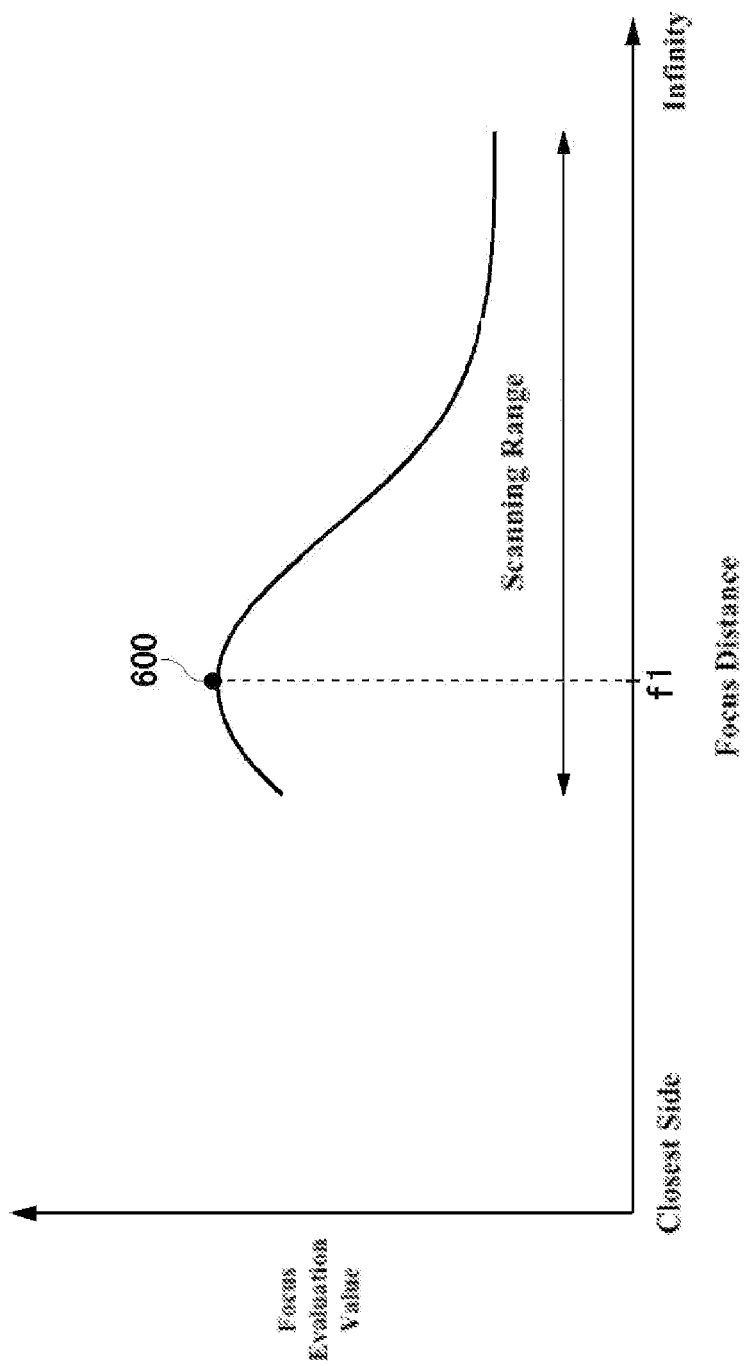
FIG. 7 is a diagram showing a relationship between a focus evaluation value and a focus distance according to an embodiment of the disclosure.

FIG. 6 shows a relationship between the focus distance and time according to an embodiment. The range determination circuit 114 determines the first range of the focus distance of the photographing device 100 from which the focus evaluation value should be derived. Then, from time T0 to time T1, the imaging controller 110 moves the focus lens. The focal length is changed in the first range. In this way, when the focus lens is moved, the derivation circuit 116 derives the focus evaluation position. Further, as shown in FIG. 7, the distance determination circuit 118 determines a focus distance f1 at which an extreme value 600 of the focus evaluation value is obtained. Then, the imaging controller 110 returns the lens position of the focus lens to a position corresponding to infinity. Next, the imaging controller 110 causes the photographing device 100 to shoot moving images while moving the lens position of the focus lens from time T2 to time T3. The imaging controller 110 suspends the movement of the focus lens at the lens position corresponding to the focus distance f1 at which the extreme value of the focus evaluation value is obtained, and causes the photographing device 100 to shoot more images at the lens position. Further, when the imaging controller 110 causes the photographing device 100 to shoot moving images, it is not necessary to move the focus lens from infinity to the closest side, but only to move the focus lens from infinity to a lens position corresponding to a focal length closer to the photographing device 100 by a preset amount from the focus distance f1.

Figure 8:
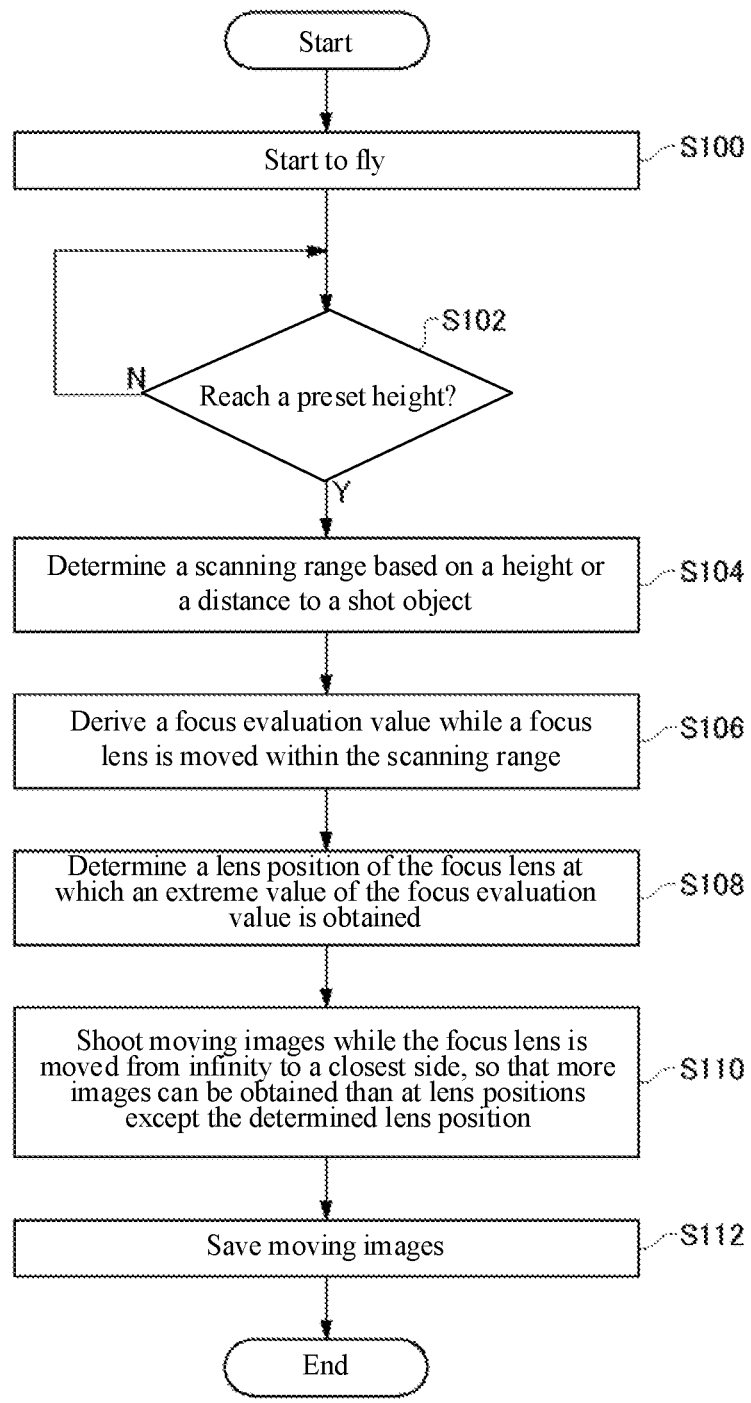
FIG. 8 is a flowchart of a shooting process according to an embodiment of the disclosure.

FIG. 8 is a flowchart of a shooting process performed by the photographing device 100 mounted at the UAV 10 according to an embodiment of the disclosure.

At S100, the UAV 10 starts to fly. The obtaining circuit 112 obtains the height of the UAV 10. The obtaining circuit 112 may obtain the height of the UAV 10 measured by the barometric altimeter 44 via the UAV controller 30. Instead of the height, the obtaining circuit 112 may obtain the distance from the photographing device 100 to the shot object. When the UAV 10 reaches a preset height (S102: Y), the range determination circuit 114 determines a scanning range of the focus lens for which the focus evaluation value should be derived based on the height or the distance to the shot object (S104). At S106, while the imaging controller 110 moves the focus lens within the determined scanning range, the derivation circuit 116 derives the focus evaluation value. At S108, the distance determination circuit 118 determines a focus distance at which the photographing device 100 should perform shooting by determining the lens position of the focus lens at which the extreme value of the focus evaluation value is obtained. At S110, the imaging controller 110 causes the photographing device 100 to shoot moving images while moving the focus lens from infinity to the closest side, so that more images can be obtained than at lens positions except the determined lens position. At S112, the imaging controller 110 stores the shot moving images in the memory 130.

As described above, while the photographing device 100 moves the focus lens, more images are shot near the determined lens position of the focus lens than at positions except the determined lens position of the focus lens. The photographing device 100 can generate a still image by allowing a user to select an image focused on the desired object from the shot moving images. The photographing device 100 shoots more images near the focus position at which the focus evaluation value is relatively high. Therefore, the photographing device 100 can more reliably shoot the image focusing on the desired object.

Figure 9:
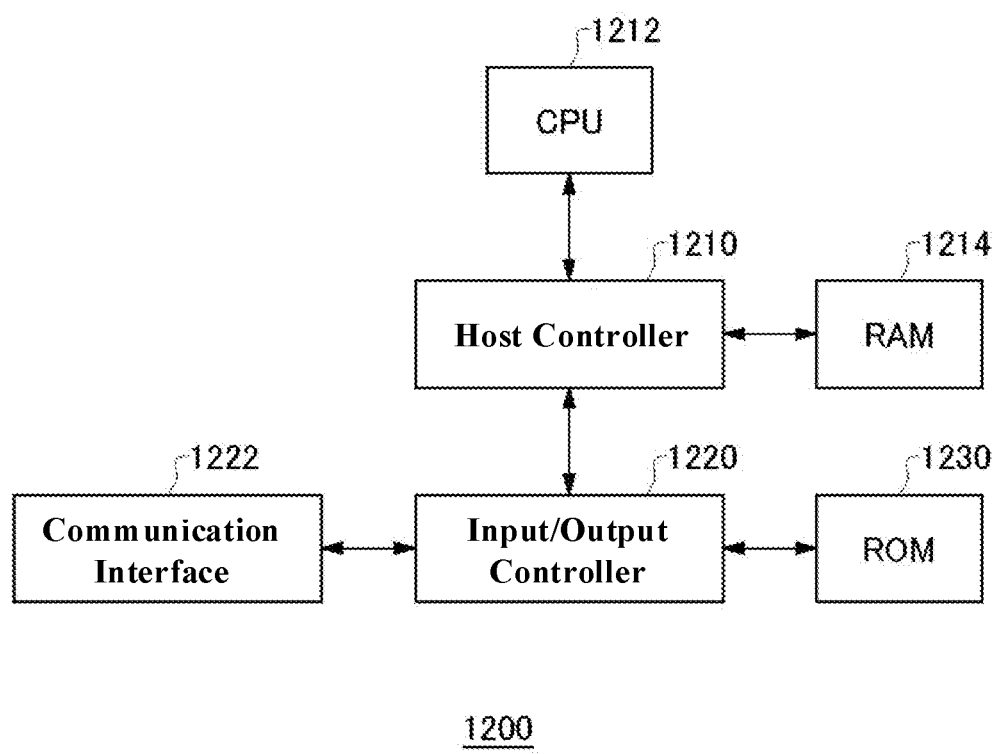
FIG. 9 is a diagram of a hardware configuration according to an embodiment of the disclosure.

FIG. 9 shows an example of a computer 1200 that may fully or partially embody the present disclosure. The program installed on the computer 1200 can make the computer 1200 function as an operation associated with a device according to the embodiments of the present disclosure or one or more "units" of the device. In some embodiments, the program can cause the computer 1200 to perform the operation or the one or more "units." The program enables the computer 1200 to execute a process or stages of the process consistent with embodiments of the present disclosure. The program can be executed by a CPU 1212 to make the computer 1200 execute specific operations associated with some or all of the blocks in the flowcharts or block diagrams described in this disclosure.

The computer 1200 of this disclosure includes the CPU 1212 and a RAM 1214, which are connected to each other through a host controller 1210. The computer 1200 further includes a communication interface 1222, an input/output unit, which is connected to the host controller 1210 through an input/output controller 1220. The computer 1200 also includes a ROM 1230. The CPU 1212 operates in accordance with programs stored in the ROM 1230 and RAM 1214 to control each unit.

The communication interface 1222 communicates with other electronic devices through a network. A hard disk drive can store programs and data used by the CPU 1212 of the computer 1200. The ROM 1230 stores a bootloader executed by the computer 1200 during operation, and/or a program dependent on the hardware of the computer 1200. The program is provided through a computer-readable medium such as a CR-ROM, a USB memory, or an IC card, or a network. The program is installed in the RAM 1214 or the ROM 1230, which are examples of computer-readable medium, and is executed by the CPU 1212. The information processing described in the programs is read by the computer 1200 and causes cooperation between the program and the various types of hardware resources described above. The device or method may be constituted by realizing the operation or processing of information with the use of the computer 1200.

For example, when a communication is performed between the computer 1200 and an external device, the CPU 1212 can execute a communication program loaded in the RAM 1214, and based on the processing described in the communication program, instruct the communication interface 1222 to perform communication processing. Under the control of the CPU 1212, the communication interface 1222 reads transmission data stored in a transmission buffer provided in a recording medium such as the RAM 1214 or a USB memory, and transmits the read transmission data to a network or writes received data received from the network in a receiving buffer provided in a recording medium.

Various types of information such as various types of programs, data, tables, and databases can be stored in the recording medium, and the information can be processed. For the data read from the RAM 1214, the CPU 1212 can execute various types of operations, information processing, conditional determination, conditional transfer, unconditional transfer, or information retrieval/replacement specified by the instruction sequence of the program described in the disclosure, and write the result back to the RAM 1214. In addition, the CPU 1212 can retrieve information in files, databases, or the like in the recording medium. For example, when a plurality of entries having attribute values of first attributes respectively associated with attribute values of second attributes are stored in the recording medium, the CPU 1212 may retrieve an entry that matches the condition that specifies the attribute value of the first attribute from the plurality of entries and read the attribute value of the second attribute stored in the entry to obtain the attribute value of the second attribute associated with the first attribute meeting a preset condition.

The programs or software modules described above may be stored at the computer 1200 or at a computer-readable storage medium near the computer 1200. In addition, a recording medium such as a hard disk or a RAM provided in a server system connected to a dedicated communication network or the internet can be used as a computer-readable storage medium to provide the program to the computer 1200 through the network.

The execution order of the actions, sequences, steps, and stages of the devices, systems, programs, and methods shown in the claims, specification, and drawings of the disclosure, can be implemented in any order as long as there is no special indication such as "before," "in advance," etc., and the output of the previous processing is not used in the subsequent processing. Regarding the operation procedures in the claims, the specification, and the drawings of the disclosure, the description is made using "first," "next," etc. for convenience, but it does not mean that the operations must be implemented in this order.

The present disclosure has been described above using embodiments, but the technical scope of the present disclosure is not limited to the scope described in the above embodiments. It is obvious to those skilled in the art that various changes or improvements can be made to the above-described embodiments. All such changes or improvements can be included in the scope of the present disclosure.

REFERENCE NUMERALS

10—UAV 20—UAV Body 30—UAV Controller 36—Communication Interface 37—Memory 40—Propulsion Unit 41—Receiver 42—Inertial Measurement Unit 43—Magnetic Compass 44—Barometric Altimeter 45—Temperature Sensor 46—Humidity Sensor 50—Gimbal 60—Photographing Device 100—Photographing Device 102—Photographing Unit 110—Imaging Controller 112—Obtaining Circuit 114—Range Determination Circuit 116—Derivation Circuit 118—Distance Determination Circuit 120—Image Sensor 130—Memory 200—Lens Unit 210—Lens 212—Lens Driver 214—Position Sensor 220—Lens Controller 222—Memory 300—Remote Operation Device 1200—Computer 1210—Host Controller 1212—CPU 1214—RAM 1220—Input/Output Controller 1222—Communication Interface 1230—ROM

What is claimed is:

1. A control device comprising:
    a processor; and
    a storage medium storing a program that, when executed by the processor, causes the processor to:
        obtain a reference distance of a photographing device, the reference distance including a height of the photographing device;
        determine a range of a focus distance of the photographing device according to the reference distance, the range being from infinity to a set distance, and the set distance being obtained by subtracting a preset amount from the reference distance; and
        control the photographing device to shoot a plurality of images while changing the focus distance within the range.

2. The control device of claim 1, wherein the height of the photographing device corresponds to a distance from the photographing device to ground or sea.

3. The control device of claim 2, wherein the ground is a floor of a building.

4. The control device of claim 1, wherein the program further causes the processor to control the photographing device to shoot moving images while moving a focus lens of the photographing device.

5. The control device of claim 3, wherein the program further causes the processor to generate a still image from the moving images.

6. The control device of claim 1, wherein the preset amount is set according to a type of the target object.

7. The control device of claim 1, wherein the program further causes the processor to:
derive, based on the plurality of images, focus evaluation values for focus distances corresponding to the plurality of images; and
determine, based on the focus evaluation values, an in-focus distance for the photographing device to shoot images.

8. The control device of claim 7, wherein:
the range is a first range of the focus distance; and
the program further causes the processor to control the photographing device to shoot a plurality of images while changing the focus distance of the photographing device within a second range of the focus distance, the second range including the in-focus distance.

9. The control device of claim 7, wherein:
the range is a first range of the focus distance; and
the program further causes the processor to control the photographing device to shoot a plurality of images while changing the focus distance of the photographing device and control the photographing device to shoot more images per unit distance range within a second range of the focus distance than outside the second range, the second range including the in-focus distance.

10. A photographing device comprising:
a control device including:
a processor; and
a storage medium storing a program that, when executed by the processor, causes the processor to:
obtain a reference distance of a photographing device, the reference distance including a height of the photographing device;
determine a range of a focus distance of the photographing device according to the reference distance, the range being from infinity to a set distance, and the set distance being obtained by subtracting a preset amount from the reference distance; and
control the photographing device to shoot a plurality of images while changing the focus distance within the range; and
an image sensor controlled by the control device.

11. A mobile object comprising:
the photographing device of claim 10; and
a support mechanism configured to support the photographing device and control an attitude of the photographing device.

12. The mobile object of claim 11, wherein the reference distance further includes a distance from the photographing device to the target device, and the distance from the photographing device to the target object is associated with a distance at which the mobile object tracks the target object.

13. A control method comprising:
obtaining a reference distance of a photographing device, the reference distance including a height of the photographing device;
determining a range of a focus distance of the photographing device according to the reference distance, the range being from infinity to a set distance, and the set distance being obtained by subtracting a preset amount from the reference distance; and
controlling the photographing device to shoot a plurality of images while changing the focus distance within the range.

14. The method of claim 13, wherein the height of the photographing device corresponds to a distance from the photographing device to ground or sea.

15. The method of claim 13, further comprising:
deriving, based on the plurality of images, focus evaluation values for focus distances corresponding to the plurality of images; and
determining, based on the focus evaluation values, an in-focus distance for the photographing device to shoot images.

16. The method of claim 15,
wherein the range is a first range of the focus distance;
the method further comprising:
controlling the photographing device to shoot a plurality of images while changing the focus distance of the photographing device within a second range of the focus distance, the second range including the in-focus distance.

17. The method of claim 15,
wherein the range is a first range of the focus distance;
the method further comprising:
controlling the photographing device to shoot a plurality of images while changing the focus distance of the photographing device and controlling the photographing device to shoot more images per unit distance range within a second range of the focus distance than outside the second range, the second range including the in-focus distance.

18. A non-transitory computer-readable storage medium storing a program that, when executed by a computer, causes the computer to perform the method of claim 13.

* * * * *